(12) United States Patent
Ebato et al.

(10) Patent No.: US 12,046,783 B2
(45) Date of Patent: Jul. 23, 2024

(54) LEAK INSPECTION METHOD AND LEAK INSPECTION APPARATUS

(71) Applicant: HONDA MOTOR CO., LTD., Tokyo (JP)

(72) Inventors: Yutaka Ebato, Wako (JP); Takaaki Mitsuoka, Wako (JP); Satoshi Oyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 70 days.

(21) Appl. No.: 17/681,807

(22) Filed: Feb. 27, 2022

(65) Prior Publication Data

US 2022/0311031 A1     Sep. 29, 2022

(30) Foreign Application Priority Data

Mar. 26, 2021 (JP) ................. 2021-053543

(51) Int. Cl.
*H01M 8/04537* (2016.01)
*H01M 8/0273* (2016.01)
*H01M 8/248* (2016.01)

(52) U.S. Cl.
CPC ..... *H01M 8/04619* (2013.01); *H01M 8/0273* (2013.01); *H01M 8/248* (2013.01)

(58) Field of Classification Search
CPC . H01M 8/248; H01M 8/0273; H01M 8/04619
See application file for complete search history.

(56) References Cited

FOREIGN PATENT DOCUMENTS

| JP | 2018-141712 A | | 9/2018 |
| JP | 6642121 B2 | * | 2/2020 |
| KR | 20090047841 A | * | 11/2007 |

* cited by examiner

*Primary Examiner* — Christopher P Domone
*Assistant Examiner* — Jonathan William Estes
(74) *Attorney, Agent, or Firm* — Carrier, Shende & Associates P.C.; Joseph P. Carrier; Jeffrey T. Gedeon

(57) ABSTRACT

A leak inspection method and a leak inspection apparatus for a fuel cell stack, in which a plurality of fuel cells are stacked, each having an electrode member and a pair of separators sandwiching the electrode member therebetween, and seal members provided on an outer peripheral portion of each of the separators, wherein a first leak inspection is performed by applying a fastening load which is a load applied to the fuel cell stack at a time of product shipment, and a second leak inspection is performed by applying to the fuel cell stack a second load which is lower than the fastening load.

5 Claims, 8 Drawing Sheets

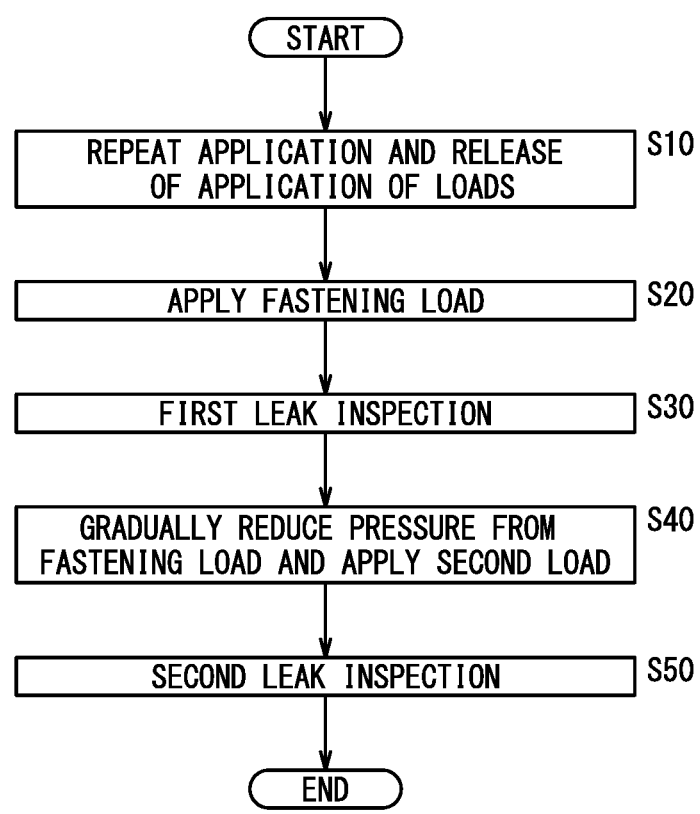

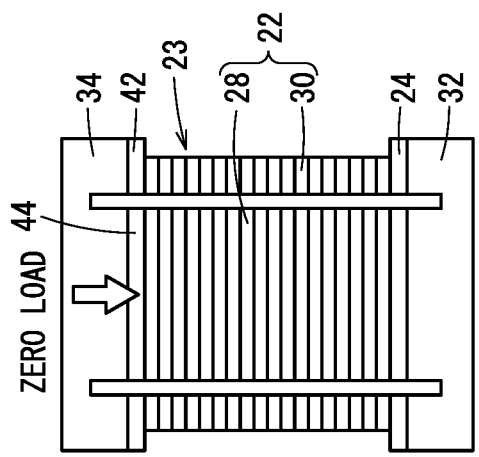
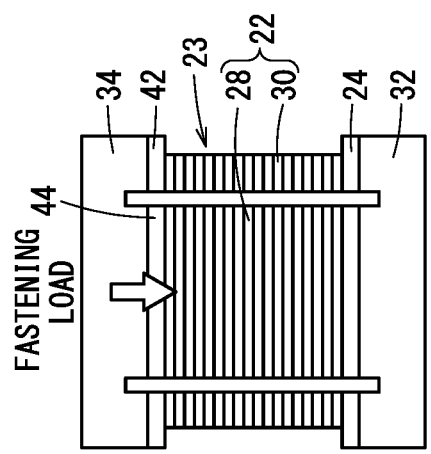
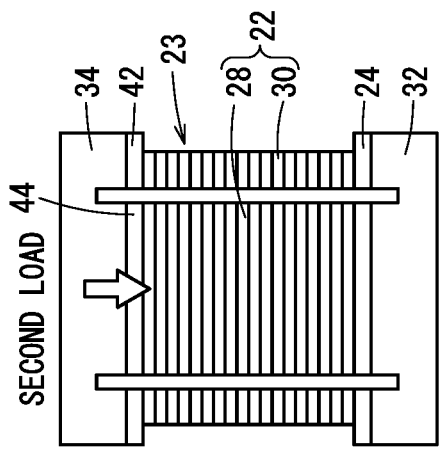

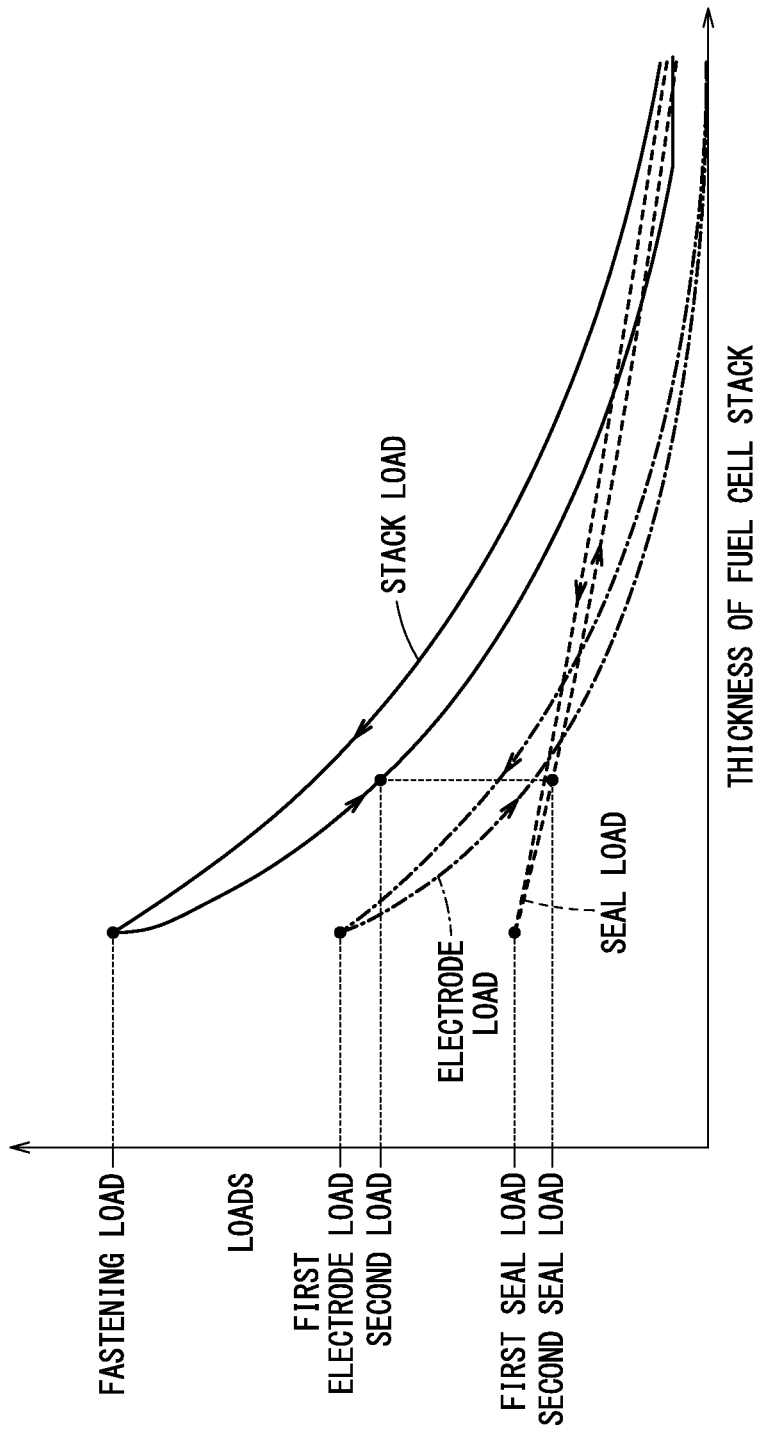

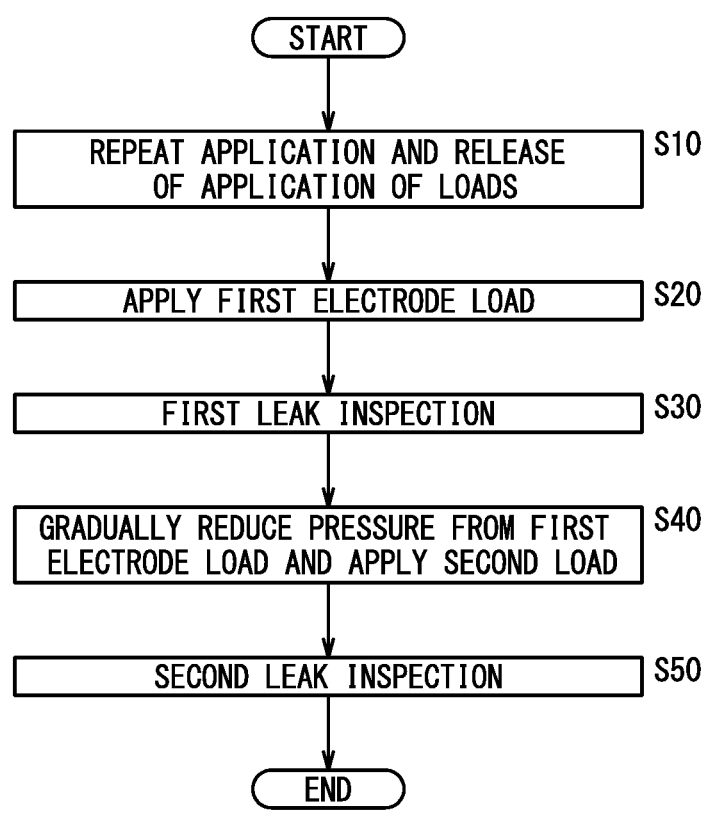

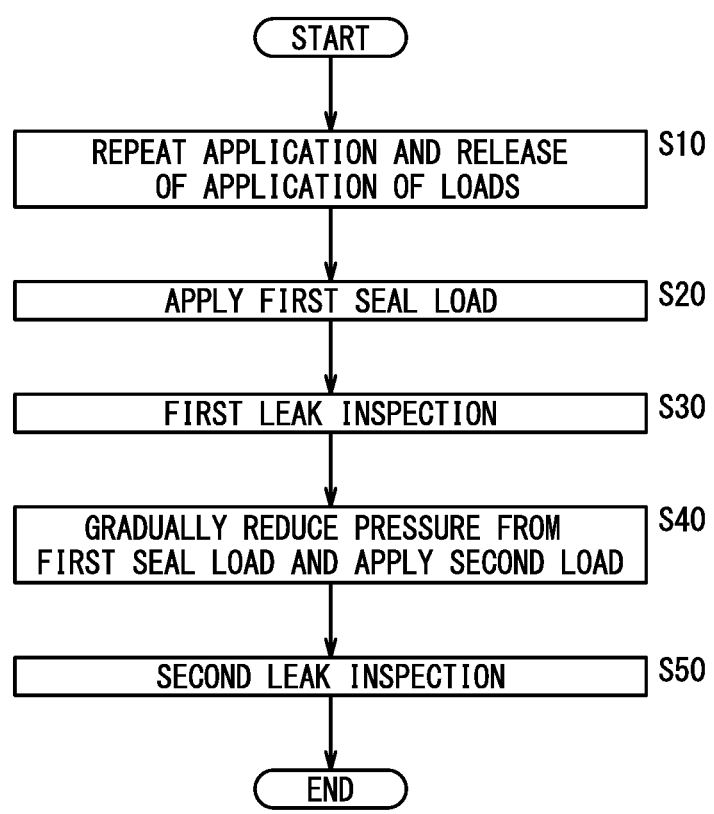

LEAK INSPECTION METHOD AND LEAK INSPECTION APPARATUS

CROSS-REFERENCE TO RELATED APPLICATIONS

This application is based upon and claims the benefit of priority from Japanese Patent Application No. 2021-053543 filed on Mar. 26, 2021, the contents of which are incorporated herein by reference.

BACKGROUND OF THE INVENTION

Field of the Invention

The present invention relates to a leak inspection method and a leak inspection apparatus configured to inspect the presence or absence of leakage of fluid from a fuel cell.

Description of the Related Art

A solid polymer electrolyte fuel cell includes an electrolyte membrane (electrolyte) made up from a polymer ion exchange membrane. A unit cell of such a solid polymer electrolyte fuel cell is constituted by a power generating cell. The power generating cell possesses a structure in which a membrane electrode assembly (MEA) is sandwiched between separators. The membrane electrode assembly includes an electrolyte membrane, and an anode and a cathode arranged respectively on both sides of the electrolyte membrane. In this type of fuel cell, usually, the fuel cell is used as a fuel cell stack, which is formed by stacking a predetermined number of power generating cells.

The above-described power generating cells include, within surfaces of the separators, a fuel gas flow path (reaction gas flow path) for enabling a fuel gas to flow along the anode, and an oxygen containing gas flow path (reaction gas flow path) for enabling an oxygen containing gas to flow along the cathode. Furthermore, the respective separators include seal members provided on peripheral edge portions thereof for sealing the fuel gas flow path and the oxygen containing gas flow path.

In the fuel gas flow path and the oxygen containing gas flow path described above, a desired sealing performance must be maintained. For this purpose, in a process of manufacturing the fuel cell stack that takes place after a process of assembling the fuel cell stack, a leak inspection is performed for determining the presence or absence of leakage of the fluids.

As one example of such a leak inspection method for a fuel cell, there is a submersion method in which the fuel cell is immersed in a liquid in order to detect air bubbles. Further, as another example of such a leak inspection method, there is a pressure change method for detecting a change in pressure after having supplied a pressurized fluid. Such a pressure change method is described, for example, in JP 2018-141712 A. As another example of such a leak inspection method, there is a differential pressure change method in which fluids having the same pressure are supplied to a reference container and to the fuel cell, and thereafter, a differential pressure between the reference container and the fuel cell is detected. As yet another leak inspection method, there is a flow rate measurement method in which leakage is detected from a flow rate of a test fluid.

SUMMARY OF THE INVENTION

In a conventional leak inspection method, the fuel cell stack is subjected to a fastening load at a time of product shipment, and then, a leak inspection is carried out by supplying a fluid to the fuel cell stack at a maximum pressure anticipated during usage thereof. However, the conventional method has a problem in that only the sealing performance immediately after assembling the fuel cell stack can be evaluated.

The fuel cell stack tends to experience a deterioration in the sealing performance thereof due to various factors in the usage environment of a user. For example, an input of an impact load due to a collision, creepage of members due to changes over time, or deterioration of the seal members due to low temperature may bring about a decrease in the sealing performance. Therefore, it would be desirable to confirm in a pre-shipment inspection that leaks do not occur in each of the respective fuel cell stacks that are shipped as products, even if a sealing performance decrease amounting to the passage of a prolonged period of time occurs.

Thus, an embodiment of the present invention has the object of providing a leak inspection method and a leak inspection apparatus, which are capable of confirming the possibility of the occurrence of leakage after the fuel cell stack has undergone changes over time.

One aspect of the present invention is characterized by a leak inspection method for a fuel cell stack in which a plurality of fuel cells are stacked, each having an electrode member and a pair of separators sandwiching the electrode member therebetween, and seal members provided on an outer peripheral portion of each of the separators, the leak inspection method comprising the steps of performing a first leak inspection for inspecting a leak in the fuel cell stack by applying a fastening load which is a load applied to the fuel cell stack at a time of product shipment, and performing a second leak inspection for inspecting a leak in the fuel cell stack by applying to the fuel cell stack a second load which is lower than the fastening load.

Another aspect of the present invention is characterized by a leak inspection apparatus for a fuel cell stack in which a plurality of fuel cells are stacked, each having an electrode member and a pair of separators sandwiching the electrode member therebetween, and seal members provided on an outer peripheral portion of the separators, the leak inspection apparatus comprising a press device configured to apply a load to the fuel cell stack, a load cell configured to detect the load that acts on the fuel cell stack, a fluid supplying device configured to supply a fluid to the fuel cell stack, a leakage detector configured to detect leakage of fluid from the fuel cell stack, and a control device, wherein the control device performs a first leak inspection by applying to the fuel cell stack a fastening load which is a load applied to the fuel cell stack at a time of product shipment, and supplying the fluid to the fuel cell stack, and performs a second leak inspection by applying to the seal members a second load which is lower than the fastening load, and supplying the fluid to the fuel cell stack.

According to the leak inspection method and the leak inspection apparatus having the above-described aspects, it is possible to confirm the possibility of the occurrence of leakage after the fuel cell stack has undergone changes over time.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3 is a flowchart showing a leak inspection method according to the first embodiment;

FIG. 4A is an explanatory diagram schematically showing a fuel cell stack in an initial state;

FIG. 4B is an explanatory diagram schematically showing the fuel cell stack when a fastening load is applied thereto;

FIG. 4C is an explanatory diagram schematically showing the fuel cell stack when a second load is applied thereto;

FIG. 5 is a graph showing a relationship between loads acting on respective components of the fuel cell stack and a thickness of the fuel cell stack;

FIG. 7 is a flowchart showing a leak inspection method according to a second embodiment; and FIG. 8 is a flowchart showing a leak inspection method according to a third embodiment.

DESCRIPTION OF THE INVENTION

Hereinafter, a description will be given in detail with reference to the accompanying drawings of preferred embodiments concerning a leak inspection method and a leak inspection apparatus.

First Embodiment

Figure 1:
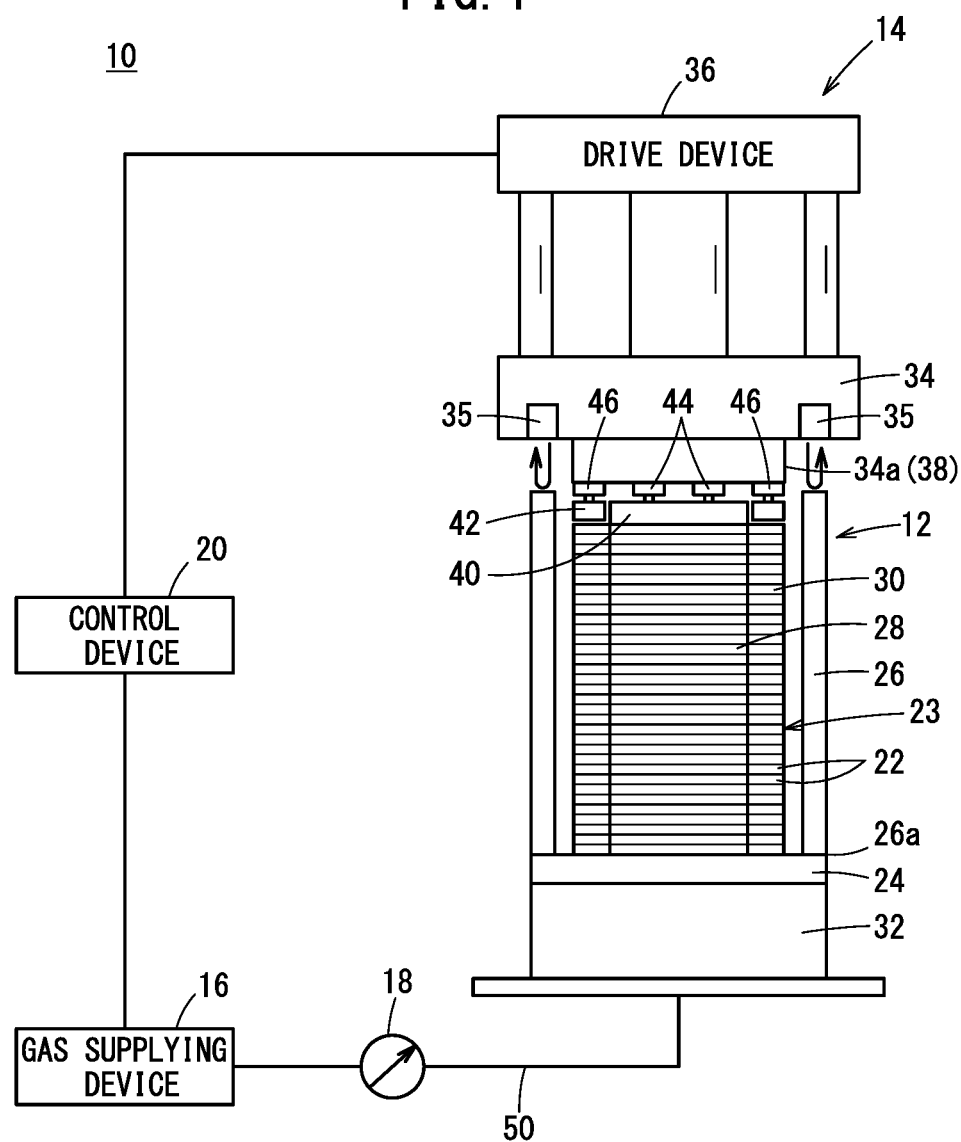
FIG. 1 is a schematic diagram of a leak inspection apparatus according to a first embodiment.

As shown in FIG. 1, a leak inspection apparatus 10 according to the present embodiment includes a press device 14, a gas supplying device 16, a leakage detector 18, and a control device 20. The press device 14 applies loads to a fuel cell stack 12. The gas supplying device 16 supplies a gas that serves as an inspection fluid to the fuel cell stack 12. The leakage detector 18 detects leakage of the fluid in the fuel cell stack 12. The control device 20 controls the gas supplying device 16 and the press device 14. The leak inspection apparatus 10 is arranged on an assembly line for the fuel cell stack 12. The leak inspection apparatus 10 is used for inspecting leakage in the fuel cell stack 12, after a cell stack body 23 of the fuel cell stack 12 has been assembled by stacking a plurality of unit cells 22.

A description will be given concerning the structure of the fuel cell stack 12 that serves as a target for the leak inspection. The fuel cell stack 12 has one end plate 24 and the cell stack body 23. The cell stack body 23 includes a plurality of the unit cells 22 that are stacked on the end plate 24. The fuel cell stack 12 includes a non-illustrated spacer, an insulating plate, and a current collecting plate, etc., provided between the cell stack body 23 and the end plate 24. The fuel cell stack 12 includes a tubular stack case 26 that covers the exterior of the cell stack body 23. The stack case 26 has a rectangular tubular shape. The stack case 26 is joined by bolts to an opening 26a of the end plate 24. Moreover, at a point in time when the leak inspection is performed, the stack case 26 need not necessarily be attached to the fuel cell stack 12.

Another end of the fuel cell stack 12 is in a state in which the unit cell 22 (including a dummy cell) at the end of the cell stack body 23 is exposed. The leak inspection according to the present embodiment is carried out in a state in which the end plate 24, the spacer, the insulating plate, and the current collecting plate, etc., at the other end are removed from the fuel cell stack 12. However, the present invention is not limited to this feature, and it is also possible to carry out the leak inspection by applying a load to the cell stack body 23 via the end plate 24.

The unit cell 22 includes an electrolyte membrane, an electrode member 28 constituted by joining electrodes on both sides thereof, and a pair of separators that sandwich the electrode member 28 therebetween. In the unit cell 22, an anode gas flow path is formed in a gap between the electrode member 28 and one of the separators. In the unit cell 22, a cathode gas flow path is formed in a gap between the electrode member 28 and another one of the separators. On an outer peripheral portion of each of the separators of the unit cells 22, seal members 30 for sealing the anode gas flow path and the cathode gas flow path are provided. The seal members 30 are formed in a frame-like shape surrounding an outer side of the electrode member 28.

Hereinafter, a description will be given concerning the configuration of each of the components of the leak inspection apparatus 10. The press device 14 includes a supporting platform 32 that supports the fuel cell stack 12. The supporting platform 32 supports from below the fuel cell stack 12 that serves as an object to be inspected. The fuel cell stack 12 is placed on the supporting platform 32 in an orientation with the end plate 24 being in contact with the supporting platform 32. In addition to the supporting platform 32, the press device 14 is equipped with a load input unit 34 arranged upwardly of the supporting platform 32, and a drive device 36 arranged on the load input unit 34 and which drives the load input unit 34.

Figure 2:
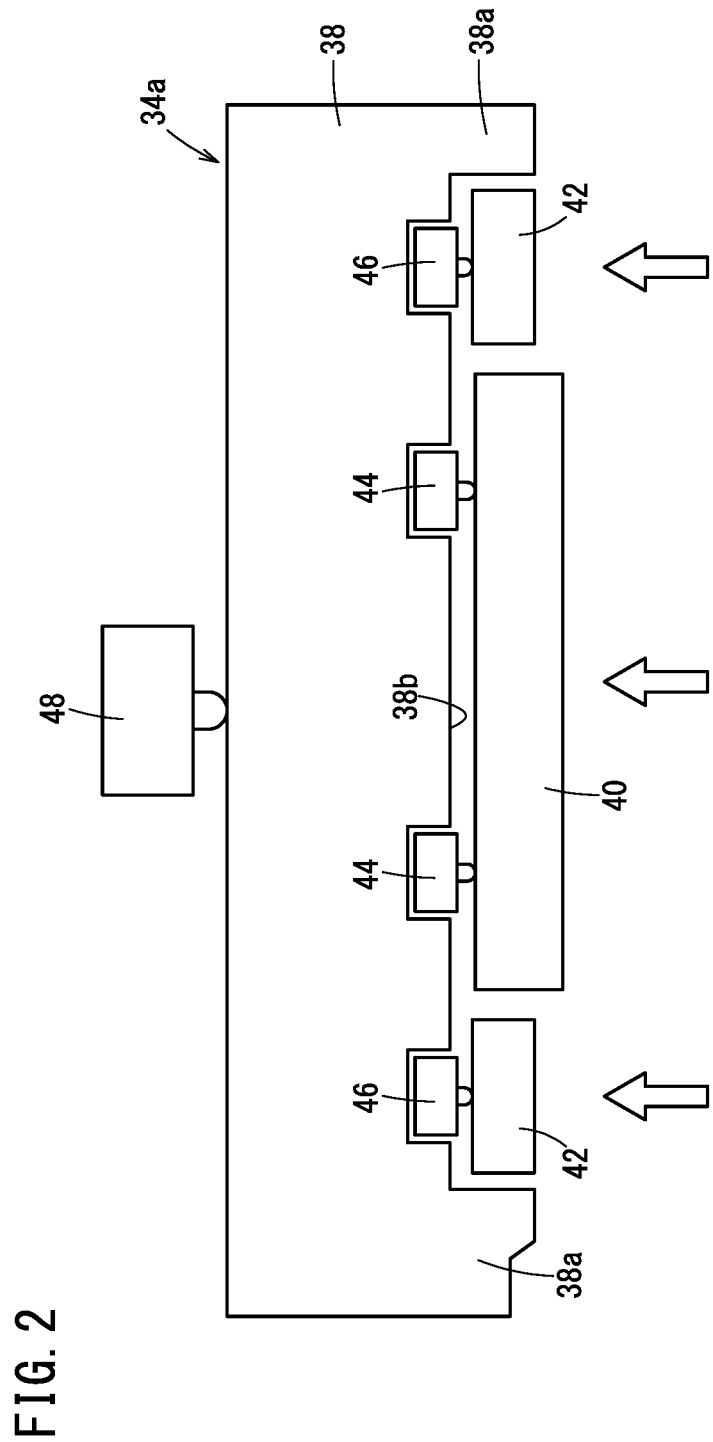
FIG. 2 is an explanatory diagram showing the configuration of a pressurizing block and load cells of the leak inspection apparatus shown in FIG. 1.

The load input unit 34 includes a pressurizing block 34a. The pressurizing block 34a possesses a dimension that is capable of being inserted in the interior of the stack case 26. As shown in FIG. 2, the pressurizing block 34a has a plate-shaped main body portion 38. The main body portion 38 possesses a planar dimension that is greater than or equal to the planar dimension of the unit cells 22. The main body portion 38 includes a protruding portion 38a that is formed in a frame-like shape. The protruding portion 38a extends downwardly from an outer peripheral portion of a lower end part of the main body portion 38. The protruding portion 38a abuts against a portion within the unit cells 22 other than the electrode members 28 and the seal members 30. On an inner side of the protruding portion 38a, the main body portion 38 includes an electrode pressurizing block 40 and a seal pressurizing block 42.

The electrode pressurizing block 40 is arranged at a site facing toward the electrode members 28 of the unit cells 22 (refer to FIG. 1). The electrode pressurizing block 40 is a plate-shaped member. The electrode pressurizing block 40 is connected to a lower surface 38b of the main body portion 38 via a plurality of first load cells 44. The electrode pressurizing block 40 abuts against the uppermost electrode member 28 of the unit cells 22, and applies a load to the electrode members 28. The plurality of first load cells 44 detect an electrode load applied to the electrode members 28.

The seal pressurizing block 42 is provided at a site of the unit cells 22 facing toward the seal members 30. The seal pressurizing block 42 is a plate-shaped member. The seal pressurizing block 42 has a frame plate-like shape, which is shaped in a manner so as to surround an outer peripheral portion of the electrode pressurizing block 40. The seal pressurizing block 42 is connected to the lower surface 38b of the main body portion 38 via a plurality of second load cells 46. The seal pressurizing block 42 abuts against the uppermost seal member 30 of the unit cells 22, and applies a load to the seal members 30. The plurality of second load cells 46 detect a seal load applied to the seal members 30.

The load input unit 34 includes a third load cell 48 at the upper end of the main body portion 38 of the pressurizing block 34a. The third load cell 48 detects a stack load. The stack load is a combined load applied to the fuel cell stack 12 as a whole, including the load applied to the electrode members 28, the load applied to the seal members 30, and the load applied to other portions thereof.

As shown in FIG. 1, the load input unit 34 includes a thickness detection sensor 35. The thickness detection sensor 35, based on the height of the upper end of the fuel cell stack 12, detects a dimension in the thickness direction of the stacked body of the unit cells 22. The thickness detection sensor 35, for example, is constituted by a non-contact type sensor such as a laser interferometer or the like.

The drive device 36 is provided on the load input unit 34. The drive device 36 is constituted, for example, by a fluid pressure cylinder. The drive device 36 causes the load input unit 34 to be driven in a vertical direction. The drive device 36 is connected to the control device 20. The drive device 36 applies a predetermined load to the load input unit 34 under the control of the control device 20.

The gas supplying device 16 supplies the inspection fluid to the fuel cell stack 12 through a gas supply line 50 at a predetermined pressure or a predetermined flow rate. The gas supplying device 16 supplies a gas that serves as the inspection fluid. The leakage detector 18 is arranged at a location midway along the gas supply line 50. The leakage detector 18 is constituted by a sensor. The sensor of the leakage detector 18 is appropriately selected according to the method of detecting leakage of the fluid. For example, in the case of adopting a method of detecting gas leakage in the fuel cell stack 12 from a decrease in pressure, the leakage detector 18 includes a pressure sensor. Further, for example, in the case of detecting leakage based on a flow rate of the fluid supplied to the fuel cell stack 12, the leakage detector 18 includes a flow rate sensor.

The control device 20 controls operations of each of the components of the leak inspection apparatus 10. Further, based on the detection result of the leakage detector 18, the control device 20 detects the presence or absence of leakage in an initial state of the fuel cell stack 12. Further, the control device 20 investigates the possibility of the occurrence of leakage in the fuel cell stack 12 after a prolonged time period has elapsed.

The leak inspection apparatus 10 according to the present embodiment is configured in the manner described above. Hereinafter, a description will be given concerning a leak inspection method in which the leak inspection apparatus 10 is used.

First, as shown in FIG. 1, the operator carries the fuel cell stack 12 in which the cell stack body 23 has been assembled, into the leak inspection apparatus 10. The operator connects the gas supply line 50 to a non-illustrated gas supply port of the fuel cell stack 12. The operator places the fuel cell stack 12 on the supporting platform 32.

Next, a leak inspection is performed by the process shown in FIG. 3. The leak inspection method proceeds to the process shown in step S10. In this step, the leak inspection apparatus 10 drives the drive device 36, and through the load input unit 34, repeatedly carries out application and release of application of the loads to the cell stack body 23 of the fuel cell stack 12. In accordance with this operation, the inclination of the unit cells 22 is leveled, and a load is evenly applied in an in-plane direction.

After completion of step S10, as shown in FIG. 4A, the fuel cell stack 12 is placed in an initial state in which the load applied thereto is zero. The fuel cell stack 12 (the stacked body of the unit cells 22) has a predetermined initial thickness.

Next, the process proceeds to step S20 shown in FIG. 3. Through the load input unit 34, the leak inspection apparatus 10 applies a fastening load to the fuel cell stack 12. The fastening load is the stack load that is applied to the fuel cell stack 12 (the stacked body of the unit cells 22) when the pair of end plates 24 are fastened at the time of product shipment.

In the process of step S20, based on the signals of the first load cells 44, the second load cells 46, and the third load cell 48, the control device 20 separately detects the loads that act on the respective components of the electrode members 28, the seal members 30, and the fuel cell stack 12 as a whole. Further, based on a detection signal of the thickness detection sensor 35, the control device 20 detects a change in the thickness of the fuel cell stack 12 with respect to the load.

As shown in FIG. 5, the load that acts on the electrode members 28, the load that acts on the seal members 30, and the load that acts on the fuel cell stack 12 show different values. Within a range in which the load applied to the fuel cell stack 12 is small, the majority of the stack load acts on the seal members 30. As the stack load increases, the electrode load that acts on the electrode members 28 increases. At this time, the majority of the stack load acts on the electrode members 28. The fastening load is set within a range in which the fastening load is larger than a minimal stack load (seal securing load) that is capable of securing the sealing performance of the seal members 30, and further, is smaller than a stack load (an excessive compression load) in which the electrode members 28 are excessively compressed (a compression that results in insufficient gas diffusivity). Preferably, the stack load is set to a value lying around midway between the seal securing load and the excessive compression load required for ensuring the sealing performance.

According to the present embodiment, when the stack load reaches the fastening load, the control device 20 stops the drive device 36, and thereby maintains the fastening load. Accompanying the increase in the stack load, as shown in FIG. 4B, the thickness of the cell stack body 23 decreases. In a state in which the fastening load is applied, a first electrode load acts on the electrode members 28. Further, a first seal load acts on the seal members 30.

Thereafter, the process proceeds to step S30 of FIG. 3. In this step, the leak inspection apparatus 10 carries out a first leak inspection. In the first leak inspection, the gas supplying device 16 supplies the inspection gas to the fuel cell stack 12. The leakage detector 18 detects the presence or absence of leakage in the fuel cell stack 12. In the case that leakage is generated in the fastening load, there is a possibility that the unit cells 22 may have a defective assembly or there is a defect in the seal members 30. Such a fuel cell stack 12 is removed as being an initially defective product.

Next, the process proceeds to step S40. In this step, the leak inspection apparatus 10 gradually decompresses (reduces the pressure of) the stack load from the fastening load. The leak inspection apparatus 10 reduces the stack load to a second load. The second load is a stack load when the seal load acting on the seal members 30 becomes a predetermined second seal load. Thereafter, the leak inspection apparatus 10 maintains the load acting on the seal members 30 at the second load. The second load and the second seal load will be described later.

As shown in FIG. 4C, when the load is changed toward a direction of decompression from the fastening load, the thickness of the fuel cell stack 12 increases. As shown in FIG. 5, the thickness of the fuel cell stack 12 exhibits hysteresis with respect to the input of the load. The thickness of the fuel cell stack 12 is affected by an influence of the load not only at the current point in time, but also loads that have been applied in the past. More specifically, the thickness of the fuel cell stack 12 exhibits a value that is of a smaller dimension in the direction of decompression than the dimension in the direction of pressurization. Changes over time in the fuel cell stack 12 occur as a change of the load in the direction of decompression. Therefore, changing the load in the direction of decompression from the fastening load and thereby bringing about the second load enables changes over time to be reflected more accurately than a case in which the second load is increased in the direction of pressurization.

In step S40, the control device 20 applies the second load based on a predetermined value (the second seal load) of the seal load of the seal members 30. The seal members 30 impart a great influence on the sealing performance in the fuel cell stack 12. Further, the seal load is capable of predicting a change of the load due to low temperature, changes over time, a collision, etc., of the seal members 30 based on the material characteristics thereof.

Figure 6:
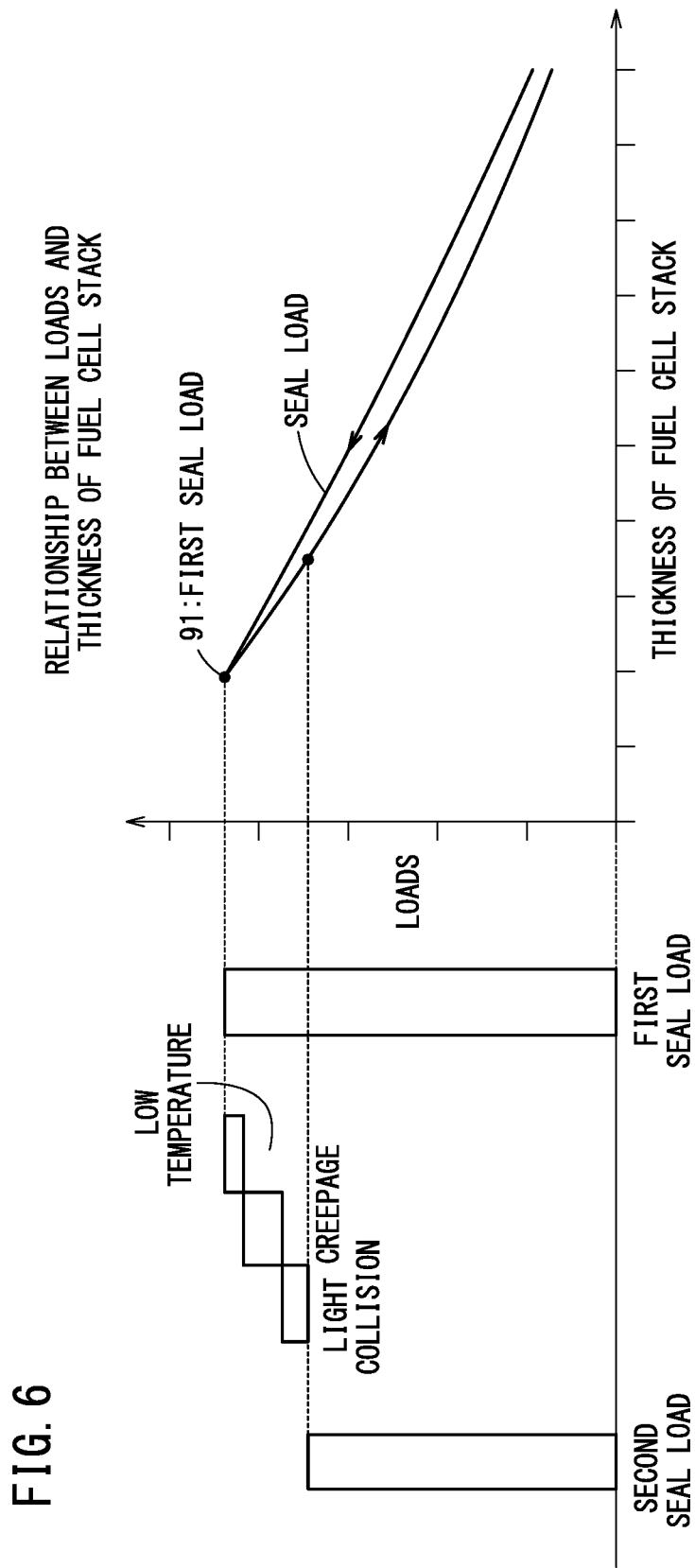
FIG. 6 is an explanatory diagram showing a relationship between the deterioration of seal members and a second seal load.

The second seal load, which serves as a reference for the second load, can be obtained as shown in FIG. 6. More specifically, at the point where the reference numeral 91 is depicted in FIG. 6, the first seal load, which corresponds to the fastening state, is input to the seal members 30. With respect to the first seal load, based on the material properties of the seal members 30, a load change component caused by heat-shrinkage due to low temperature, a load change component due to creep deformation over the elapse of a predetermined time period (for example, ten years or the like), and a load change component occurring due to deformation caused by the input of a predetermined impact load due to a collision or the like are obtained. The second seal load can be obtained by subtracting from the first seal load the summation value of each of the load change components due to low temperature, creep deformation, and a collision as mentioned above. Although not particularly limited to this feature, for example, in the case that the value of the first seal load is set to 1, the value of the second seal load can be set to a value around 0.5. Factors to be considered when calculating the second seal load are not limited to the aforementioned three factors, and the second seal load may be obtained by incorporating other factors.

Thereafter, the process proceeds to step S50 of FIG. 3. In this step, the leak inspection apparatus 10 carries out a second leak inspection under a condition in which the second load is applied to the seal members 30. The second leak inspection can be carried out in the same manner as the first leak inspection (step S30).

By the second leak inspection of step S50, it is possible to evaluate the presence or absence of leakage in a state in which the sealing performance has decreased due to changes over time in the fuel cell stack 12.

The leak inspection method and the leak inspection apparatus 10 of the present embodiment exhibit the following advantageous effects.

The leak inspection method according to the present embodiment is a leak inspection method for the fuel cell stack 12 in which the plurality of fuel cells (the unit cells 22) are stacked, each having the electrode member 28 and the pair of separators sandwiching the electrode member 28 therebetween, and the seal members 30 provided on the outer peripheral portion of each of the separators, the leak inspection method comprising the steps of performing the first leak inspection (step S30) for inspecting a leak in the fuel cell stack 12 by applying the fastening load (step S20) which is a load applied to the fuel cell stack 12 at the time of product shipment, and performing the second leak inspection (step S50) for inspecting a leak in the fuel cell stack 12 by applying to the fuel cell stack 12 the second load (step S40) which is lower than the fastening load.

In accordance with the above-described leak inspection method, the second leak inspection is performed by reducing the load applied to the fuel cell stack 12, taking into consideration a decrease in the sealing performance due to changes over time in the fuel cell stack 12. Therefore, in accordance with the leak inspection method of the present embodiment, it is possible to evaluate the presence or absence of leakage in the fuel cell stack 12 after having been subjected to deterioration over time.

In the above-described leak inspection method, the second leak inspection (step S50) may be carried out by applying the fastening load to the fuel cell stack 12, and thereafter, changing the load in the direction of decompression and applying the second load to the fuel cell stack 12. In accordance with such a leak inspection method, a more accurate leak inspection can be performed under conditions that take into consideration the state in which the fuel cell stack is used.

The leak inspection apparatus 10 according to the present embodiment relates to the leak inspection apparatus 10 for the fuel cell stack 12, in which the plurality of fuel cells (the unit cells 22), each having the electrode member 28 and the pair of separators sandwiching the electrode member 28 therebetween, and the seal members 30 provided on the outer peripheral portion of the separators, the leak inspection apparatus 10 comprising the press device 14 that applies the loads to the fuel cell stack 12, the first load cells 44 arranged on the electrode members 28 and which detects the electrode load that acts on the electrode members 28, the second load cells 46 arranged on the seal members 30 and which detects the seal load that acts on the seal members 30, the fluid supplying device (for example, the gas supplying device 16) that supplies the fluid to the fuel cell stack 12, the leakage detector 18 that detects leakage of the fluid from the fuel cell stack 12, and the control device 20, wherein the control device 20 performs the first leak inspection (step S30) by applying to the fuel cell stack 12 the fastening load which is the load applied to the fuel cell stack 12 at the time of product shipment, and supplying the fluid to the fuel cell stack 12, and performs the second leak inspection (step S50) by applying to the seal members 30 the second load (step S40) which is lower than the fastening load, and supplying the fluid to the fuel cell stack 12.

In accordance with the above-described leak inspection apparatus 10, it is possible to evaluate the presence or absence of leakage after the occurrence of changes over time, which are reflective of a decrease in the sealing performance caused by deterioration over time of the fuel cell stack 12.

In the above-described leak inspection apparatus 10, the second leak inspection may be carried out by applying the fastening load to the fuel cell stack 12, and thereafter, applying the second load to the seal members 30 while changing the load in the direction of decompression. In accordance with such a leak inspection apparatus 10, a more accurate leak inspection can be performed under conditions that take into consideration the state in which the fuel cell stack is used.

Second Embodiment

The leak inspection method according to the present embodiment is a partial modification of the leak inspection method shown in FIG. 3. Moreover, since the leak inspection apparatus 10 used in the leak inspection method of the present embodiment is the same as that described with reference to FIGS. 1 and 2, description thereof will be omitted.

As shown in FIG. 7, in the present embodiment, the operation of applying the load to the fuel cell stack 12 in step S20 differs from that of the leak inspection method shown in FIG. 3. In step S20 of FIG. 7, the control device 20 increases the stack load input to the fuel cell stack 12 through the load input unit 34 until the electrode members 28 reach the first electrode load. In this instance, the first electrode load is obtained as (an average value of) an electrode load that acts on the electrode members 28 when the fastening load is applied to a typical fuel cell stack 12. In this manner, in the present embodiment, the fastening load applied to the entire fuel cell stack 12 is determined based on the detected value of the first load cells 44.

Since the other steps of the leak inspection method according to the present embodiment are the same as in the leak inspection method described with reference to FIG. 3, descriptions of step S10, step S30, step S40, and step S50 are omitted.

In the foregoing manner, in the leak inspection method of the present embodiment, in step S20, the control device 20 determines, from the electrode load (first electrode load) that acts on the electrode members 28 at the time of shipment, the fastening load applied when the first leak inspection (step S30) is carried out. According to such a method, even in the case that a variance occurs in the thickness of the unit cells 22 of the fuel cell stack 12, the load that acts on the electrode members 28 can be kept constant.

Third Embodiment

The leak inspection method according to the present embodiment is a partial modification of the leak inspection method shown in FIG. 3. Moreover, because the leak inspection apparatus 10 used in the leak inspection method of the present embodiment is the same as that described with reference to FIGS. 1 and 2, description thereof will be omitted.

As shown in FIG. 8, in the present embodiment, the operation of applying the load to the fuel cell stack 12 in step S20 differs from that of the leak inspection method shown in FIG. 3. In step S20 of FIG. 8, the control device 20 (see FIG. 1) determines the fastening load based on the seal load applied to the seal members 30. More specifically, the control device 20 causes the load of the load input unit 34 to increase until the detected value of the second load cells 46 becomes the first seal load. The first seal load is a seal load at the time when a fastening load is applied to a typical fuel cell stack 12. In this manner, in the leak inspection method according to the present embodiment, the fastening load applied to the fuel cell stack 12 is determined based on the detected value of the second load cells 46.

Because the other steps of the leak inspection method according to the present embodiment are the same as in the leak inspection method described with reference to FIG. 2, descriptions of step S10, step S30, step S40, and step S50 are omitted.

In the foregoing manner, in the leak inspection method of the present embodiment, the load applied in the first leak inspection is the first seal load that acts on the seal members 30 at the time of product shipment. In accordance with this method, the first leak inspection and the second leak inspection can be managed only by the seal load.

Although preferred embodiments of the present invention have been presented and described above, the present invention is not limited to the above-described embodiments, and it goes without saying that various modifications could be adopted therein within a range that does not depart from the essence and gist of the present invention.

What is claimed is:

1. A leak inspection method for a fuel cell stack in which a plurality of fuel cells are stacked, each having an electrode member and a pair of separators sandwiching the electrode member therebetween, and seal members provided on an outer peripheral portion of each of the separators, wherein the leak inspection method is performed after assembly of the fuel cell stack as a product in which the plurality of fuel cells are stacked, the leak inspection method comprising the steps of:
    applying to the fuel cell stack a fastening load which is a load applied to the fuel cell stack as a product;
    performing a first leak inspection for inspecting a leak in the fuel cell stack to which the fastening load is being applied;
    after the first leak inspection, applying to the fuel cell stack a second load which is lower than the fastening load; and
    performing a second leak inspection for inspecting a leak in the fuel cell stack to which the second load is being applied.

2. The leak inspection method according to claim 1, wherein the applying of the second load includes applying the fastening load to the fuel cell stack, and thereafter, changing the load in a direction of decompression and applying the second load to the fuel cell stack.

3. The leak inspection method according to claim 1, wherein the second load of the second leak inspection is a second seal load which is smaller than a first seal load that acts on the seal members of the fuel cell stack as a product.

4. The leak inspection method according to claim 1, wherein the load of the first leak inspection is a first electrode load that acts on the electrode member of the fuel cell stack as a product.

5. The leak inspection method according to claim 1, wherein the load of the first leak inspection is a first seal load that acts on the seal members of the fuel cell stack as a product.

* * * * *